US010003621B2

(12) United States Patent
Fedorov

(10) Patent No.: US 10,003,621 B2
(45) Date of Patent: *Jun. 19, 2018

(54) MULTIMEDIA ROUTING SYSTEM FOR SECURING THIRD PARTY PARTICIPATION IN CALL CONSULTATION OR CALL TRANSFER OF A CALL IN PROGRESS

(71) Applicant: Genesys Telecommunications Laboratories, Inc., Daly City, CA (US)

(72) Inventor: Sergey Fedorov, Moraga, CA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/345,371

(22) Filed: Nov. 7, 2016

(65) Prior Publication Data

US 2017/0142169 A1   May 18, 2017

Related U.S. Application Data

(63) Continuation of application No. 14/628,184, filed on Feb. 20, 2015, now Pat. No. 9,491,204, which is a
(Continued)

(51) Int. Cl.
*H04L 29/06* (2006.01)
*H04M 3/51* (2006.01)

(52) U.S. Cl.
CPC ...... *H04L 65/4007* (2013.01); *H04L 65/1006* (2013.01); *H04L 65/1069* (2013.01); *H04L 65/1089* (2013.01); *H04M 3/5158* (2013.01)

(58) Field of Classification Search
CPC ............ H04L 65/1006; H04L 65/1089; H04M 3/5158
(Continued)

(56) References Cited

U.S. PATENT DOCUMENTS 8,774,389 B2   7/2014   Kagan et al.
8,995,423 B2   3/2015   Fedorov
(Continued)

FOREIGN PATENT DOCUMENTS

EP   1435722 A2   7/2004
EP   2491707 A1   8/2012
WO   2011050028 A1   4/2011

OTHER PUBLICATIONS

European Office action for Application No. 10775978.9, dated Jul. 24, 2013, 4 pages.
(Continued)

*Primary Examiner* — Harry S Hong
(74) *Attorney, Agent, or Firm* — Lewis Roca Rothgerber Christie LLP

(57) ABSTRACT

A multimedia router has code executable on the router from storage on a machine readable medium coupled to the router, the code providing routing functions, and a routing point identified in the router code for establishing at least one non-voice communications session between two or more communications appliances enabled for non-voice communications. During a voice call established between a calling party and one of the two or more communications appliances, the routing point is invoked from the called communications appliance by issuance of a non-voice routing request to establish at least one non-voice communications session between the called communications appliance and another of the two or more communications appliances.

20 Claims, 5 Drawing Sheets

Related U.S. Application Data continuation of application No. 12/582,921, filed on Oct. 21, 2009, now Pat. No. 8,995,423.

(58) Field of Classification Search
 USPC .................................................. 379/266.07
 See application file for complete search history.

(56) References Cited

U.S. PATENT DOCUMENTS

| | | | |
|---|---|---|---|
| 9,491,204 B2* | 11/2016 | Fedorov | H04M 3/51 |
| 2004/0042612 A1 | 3/2004 | Michelson et al. | |
| 2005/0129214 A1 | 6/2005 | Tyagarajan et al. | |
| 2006/0203994 A1 | 9/2006 | Shaffer et al. | |
| 2006/0239442 A1 | 10/2006 | Shaffer et al. | |
| 2007/0064912 A1 | 3/2007 | Kagan et al. | |
| 2007/0070980 A1 | 3/2007 | Phelps et al. | |
| 2007/0127670 A1 | 6/2007 | Morishima et al. | |
| 2008/0049734 A1 | 2/2008 | Zhakov et al. | |
| 2008/0285739 A1 | 11/2008 | Golitsin et al. | |
| 2010/0061529 A1 | 3/2010 | Cloran | |
| 2010/0085900 A1 | 4/2010 | Stenman et al. | |
| 2010/0246800 A1 | 9/2010 | Geppert et al. | |
| 2011/0090899 A1 | 4/2011 | Fedorov | |
| 2015/0172326 A1 | 6/2015 | Fedorov | |

OTHER PUBLICATIONS

International Preliminary Report on Patentability and Written Opinion for International Application No. PCT/US2010/053323, dated Apr. 24, 2012, 7 pages.

International Search Report for Application No. PCT/US2010/053323, dated Feb. 2, 2011, 4 pages.

Written Opinion of the International Search Authority for International Application No. PCT/US2010/053323, dated Apr. 21, 2012, 6 pages.

* cited by examiner

MULTIMEDIA ROUTING SYSTEM FOR SECURING THIRD PARTY PARTICIPATION IN CALL CONSULTATION OR CALL TRANSFER OF A CALL IN PROGRESS

CROSS-REFERENCE TO RELATED APPLICATIONS

This application is a continuation of U.S. patent application Ser. No. 14/628,184, filed on Feb. 20, 2015, now U.S. Pat. No. 9,491,204, which is a continuation of U.S. patent application Ser. No. 12/582,921, filed on Oct. 21, 2009, now U.S. Pat. No. 8,995,423, the disclosures of which are incorporated herein by reference in their entirety.

BACKGROUND OF THE INVENTION

1. Field of the Invention

The present invention is in the field of telephony communications including data network telephony, of which Internet protocol network telephony is a subset, and pertains particularly to methods and apparatus for synchronizing multimedia requests during call distribution within a communications center.

2. Discussion of the State of the Art

In the field of telephony communications, call centers have evolved into multimedia communications centers where agents using a variety of real-time media handle service and sales requests. Agents of a communications center are typically equipped with a local area network (LAN)-connected computer having a graphic user interface (GUI) and a telephone handset or headset for conducting voice calls. Agents may also engage customers using instant messaging and other real-time text messaging services, Voice over Internet protocol (VoIP), and real-time chat applications.

Various types of customer engagement campaigns may be practiced in a communications center environment. Customers calling into the center may do so through telephone networks such as the public switched telephone network (PSTN), wireless carrier networks, and from the Internet network. Voice calls may be answered by interactive voice response (IVR) attendant and be pre-screened before routing those calls requiring live assistance to an appropriate queue for connecting to live agents.

In a state-of-the-art communications center it is desired that revenue loss caused by customer dropout from queue while waiting for live assistance is kept to a minimum. However, certain types of campaigns require interface by a first agent followed by transfer to a second agent to finish call processing. One example would be that of an outbound contact campaign where live agents are used to qualify connected leads (customers connected by voice) for transaction closers (also live agents). Outbound connections are routed internally as inbound calls, but from a business perspective carry a higher priority than cold inbound calls because of a higher probability that an agent will be able to successfully resolve them.

A problem exists in such a scenario as described above where the first agent must find a second agent to which to transfer the qualified caller to finish a transaction. The caller must be placed on hold in many instances to wait for a second agent to become available and connect. As a result, a certain percentage of these callers drop out of queue while on hold waiting for an agent.

Therefore, what is clearly needed is a system and methods for enabling calls in progress with live agents to be transferred or otherwise serviced by second agents without requiring these calls to be placed on hold while second agents are found to finish transactions.

SUMMARY OF THE INVENTION

The problem stated above is that it is desirable to retain callers in conversation with an agent while waiting for an available agent to take a call transfer or to conference in with the caller and original agent in a call center routing system, but many of the conventional means for transferring calls and securing a second agent for conferencing, such as single media routing routines, also facilitate a certain percentage of lost revenue due to callers dropping out from queue during the wait for an available second agent. The inventors therefore considered functional components of a call-center routing system, looking for elements that exhibit interoperability that could potentially be harnessed to provide call transfer and consult services for connected callers but in a manner that would not create a predictable amount of revenue loss due to calls dropped while waiting for the second agent to become available.

The success of every call center sales campaign depends in part on the proficiency of live agents generating transactions, one by-product of which is profit for the center. Most such call centers employ telephone routing systems with interaction queues to manage the incoming transaction flow from the customer access channels including outbound contacts converted into valuable inbound calls, and call routing and queuing systems are typically a part of such apparatus.

The present inventor realized in an inventive moment that if, at the point of need during a live interaction, a caller could remain engaged with the original agent while a second agent is found to accept a call transfer or call consult request, more profit for the campaign might result. The inventor therefore constructed a unique routing system for a call center system that allowed agents requiring assistance from a second agent to resolve a transaction by call transfer or call consult to initiate routing requests for such services while maintaining the current connection with the caller. A significant increase in revenue results, with no impediment to call flow or call handling proficiency created.

Accordingly, in one embodiment of the present invention, a multimedia router is provided and includes code executable on the router from storage on a machine readable medium coupled to the router, the code providing routing functions, and a routing point identified in the router code for establishing at least one non-voice communications session between two or more communications appliances enabled for non-voice communications. During a voice call established between a calling party and one of the two or more communications appliances, the routing point is invoked from the called communications appliance by issuance of a non-voice routing request to establish at least one non-voice communications session between the called communications appliance and another of the two or more communications appliances.

In one embodiment the two or more communications appliances are one or a mix of fixed and or mobile telephones, computing appliances or a combination thereof. In one embodiment the routing request is queued and then, if no appliances are ready to take a voice call, routed to one of a plurality of enabled communications appliances wherein the average handling time for the current transaction being handled at the appliance is close to or has exceeded a limit, and therefore probable to become shortly available.

In a preferred embodiment, upon the routing request being accepted, a transaction server enabled with session initiation protocol (SIP) establishes as the non-voice communication session, one of an instant message session, a chat session, a file sharing session, or a combination thereof. In one embodiment the established voice call is a one of an analog voice call or a VoIP call.

In one embodiment data about the call and/or the calling party is forwarded to the accepting communications appliance from the requesting communications appliance over the non-voice session established. In one embodiment, after establishment of the non-voice communication session, the router transfers the voice session from the called communications appliance to the communications appliance connected to the called communications appliance via the non-voice session. In another embodiment the non-voice session established between the called communications appliance and the other of two or more communications appliances is a consulting session and the voice session is not transferred.

In one embodiment in the event of call transfer, after the establishment of the voice transaction between the calling party and the accepting communication appliance, the original voice transaction is terminated. In one embodiment as a result of the non-voice communications session established between the called communications appliance and the accepting communications appliance, a second non-voice communications session is established between the caller operating a SIP-enabled appliance and the accepting communications appliance.

In one embodiment the caller remains connected to the called communications appliance in voice session while interacting with the accepting communications appliance over the second non-voice communications session.

According to another aspect of the invention, a method for soliciting engagement of a party to a voice communications session in progress between a calling party and one of two or more communications appliances is provided comprising steps for (a) receiving at a router a request for establishment of a non-voice communications session from the called communications appliance during the voice session, (b) routing the request to a selected one of the two or more communications appliances, and (c) establishing a non-voice communications session between the requesting communications appliance and the selected one of the two or more communications appliances upon the request being accepted at the selected communications appliance.

In one aspect of the method in step (b), the selection is made upon determining current or near term availability of a communications appliance, near term meaning that the appliance is currently engaged in a voice session. In one aspect the method includes a step (d) for conveying or causing conveyance of information about the caller and voice session in progress to the accepting communications appliance over the non-voice session.

In a preferred aspect of the method, in step (c) a transaction server enabled with session initiation protocol (SIP) establishes as the non-voice communication session, one of an instant message session, a chat session, a file sharing session, or a combination thereof. In one aspect the two or more communications appliances are one or a mix of fixed and or mobile telephones, computing appliances, or a combination thereof.

In one aspect where information about the caller or call is conveyed to the accepting communications device in step (d), the conveyance of information occurs while the calling party is in conversation with an agent operating the called communications appliance while a second agent operating the appliance connected to the called appliance via non-voice session is completing a transaction with another caller.

In one aspect the method includes a step (d) for transferring the voice session in progress between the calling party and the called communications appliance to the communications appliance connected by non-voice session to the called appliance. In another embodiment the method includes a step (d) for establishing a non-voice session between the caller and the communications appliance connected in non-voice session at step (c) while the caller is connected in voice session to the original communications appliance. In one aspect of the method in step (c) information sharing over the non-voice session is performed between a calling campaign application and a sales application.

BRIEF DESCRIPTION OF THE DRAWING FIGURES

DETAILED DESCRIPTION

The present inventors provide a unique multimedia call distribution system that allows connected callers to be transferred from original agents to second agents to aid in call resolution, reducing or eliminating dropout. The system and methods for practicing the present invention are described in enabling detail using the following examples, which may represent more than one embodiment of the present invention.

Figure 1:
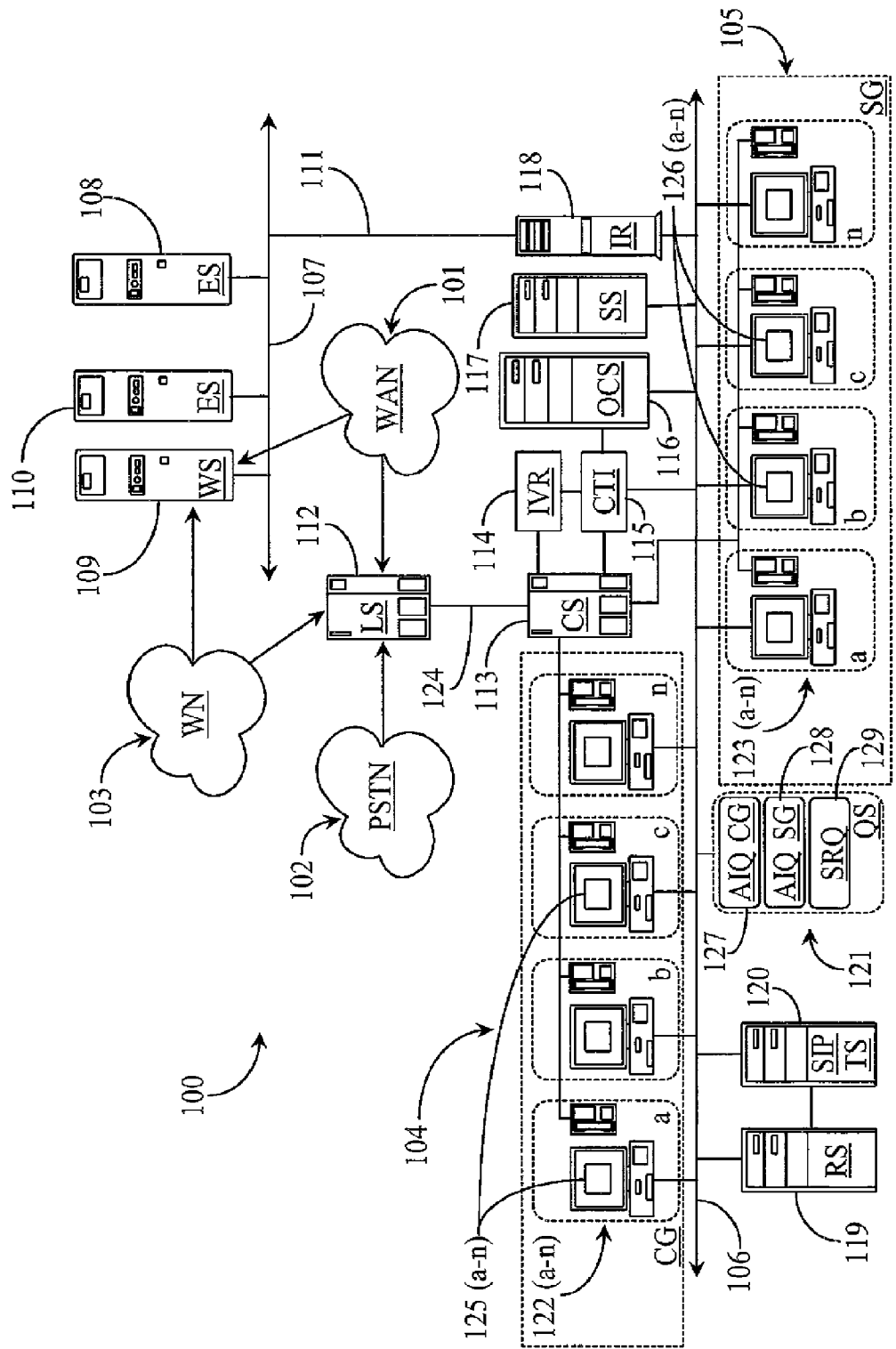
FIG. 1 is an architectural view of a communications network 100 supporting multimedia synchronized call distribution to live resources according to an embodiment of the present invention.

FIG. 1 is an architectural view of a communications network 100 supporting multimedia synchronized call distribution to live resources according to an embodiment of the present invention. Communications network 100 includes a wide area network (WAN) 101, a public-switched-telephone-network (PSTN) 102, and a wireless carrier network (WN) 103. A communications center environment (CCE) is illustrated in this example and includes, among other communications center equipment, an agent campaign group (CG) 104 and an agent sales group (SG) 105. Each agent group, CG 104 and SG 105 is supported by a communication center LAN 106 provided within the communications center environment.

CG 104 includes a plurality of individual agent terminals or stations 125 (*a-n*). Each campaign terminal includes, in this example, a LAN-connected computing appliance and a telephone handset. SG 105 includes a like plurality of individual agent terminals or stations 123 (*a-n*). Each sales terminal includes, in this example, a LAN-connected computing appliance and a telephone handset. In this example the term terminal refers to an individual destination point for a routed call rather than a single communications device. Each agent terminal in CG 104 or in SG 105 may include multiple communications devices. The depiction of a computer having a GUI and a telephone handset is exemplary only. Laptops, personal digital assistants, cellular telephones, fax machines, and the like may all be included as potential communications devices within an agent terminal.

Handsets illustrated within agent terminals 122 (*a-n*) and agent terminals 123 (*a-n*) are connected to a central telephone switch (CS) 113 maintained within the communications center environment. CS 113 may be a private branch exchange (PBX) connected internally within in the center to all of the agent handsets. In one embodiment all of the handsets are PBX telephones adapted to handle VoIP calls and are further enabled to practice session initiation protocol (SIP), which is a well-known communications protocol for enabling peer-to-peer data and voice sessions between participating terminals or end devices. CS 113 may be a soft switch instead of a hardware switch without departing from the spirit and scope of the present invention. In this example the communications center environment is represented by all of the communications and routing equipment having LAN support of LAN 106.

CS 113 is enhanced for computer telephony integration (CTI) by way of a CTI processor 115 connected to the switch by a CTI link. CTI processor is connected to LAN 106 and provides call-processing intelligence to CS 113. CS 113 is connected to a local telephone switch (LS) 112 in the telephone network by a telephone trunk 124. LS 112 may be an automated call distributor (ACD), a PBX, or another type of call processing switch. LS 112 may represent a last stop for telephone calls destined for CS 113 and internal call distribution. LS 112 may accept calls from PSTN 102. LS 103 may also accept calls from WN 103 through appropriate network gateway (not shown). LS 112 may also accept calls from WAN 101.

In this example an IVR unit 114 connected to CTI processor 115 and to switch 113 intercepts callers registered at switch 113. IVR 114 is used to prescreen callers for self-service channels and for live interaction channels. Inbound interaction requests may include direct inbound interactions and inbound interactions that were solicited through a proactive campaign such as an outbound contact campaign. Other proactive campaigns such as Web-based proactive invitation may also be practiced in this example without departing from the spirit and scope of the present invention.

An outbound contact server (OCS) 116 is provided within the CCE and is connected to LAN 106 and to CTI processor 115. OCS 116 includes a digital storage medium internal thereto or otherwise accessible thereto for storing the data and software required to enable server function. In this example the CCE is running an outbound calling campaign using OCS 116, which is adapted to dial out and connect to customers from a customer list. Customers that answer outbound calls are connected to, IVR 114 for initial processing and then routed to available agents in CG 104 for transaction setup and qualification. The CCE includes a queue system (QS) 121 connected to LAN 106. Queue system 121 includes an agent interaction queue (AIQ) 127 for CG 104 and an AIQ for SG 105. Calls that require live assistance are routed to AIQ 127 initially to wait for an available campaign agent from CG 104. QS 121 may include a separate campaign sales request queue (SRQ) 129. SRQ 129 is adapted to queue requests for sales assistance generated from agents in CG 104 whom are in direct communication with customers. In one embodiment AIQ for SG 105 is a priority ordered queue wherein sales requests take priority over general unsolicited inbound interactions in the queue at certain times or on a continuous basis.

LAN 106 is enabled in this example for transfer control protocol over Internet protocol (TCP/IP) and other Internet protocols. LAN 106 supports a routing server (RS) 119 within the CCE that is adapted to serve routing strategies to requesting machines and or software clients. RS 119 includes a digital storage medium (not shown) internal thereto or otherwise accessible thereto for storing the data and software required to enable server function. LAN 106 supports a statistics server (SS) 117 adapted to serve current real-time statistics about the CCE such as estimated waiting time (EWT) in queue, average handling time (AHT) of a call by an agent or group of agents, and other like statistics. Server 117 may also maintain current statistics on agent availability for all agents working within the CCE. Server 117 includes a digital storage medium internal thereto or otherwise accessible thereto for storing the data and software required to enable server function.

LAN 106 supports an Internet protocol router (IR) 118. IR 118 provides connection for the CCE to the Internet represented herein by WAN 101 and also by an Internet backbone 107. IR 118 has connectivity to the Internet via an Internet access line 111. Internet backbone represents the lines, equipment, and access points that make up the Internet network as a whole. Therefore, there are no geographic limitations to the practice of the present invention. Internet backbone 107 supports a Web server (WS) 109 adapted to contain and serve Websites including Web pages upon request using a request response protocol. WS 109 may be hosted by a Web services provider or by the CCE. In one embodiment WS 109 includes a corporate Web site leveraged by an organization contracting with the CCE to provide call center services. In this embodiment visitors may access the Web site of the company and may initiate both self service and live treatment through the Web site interface (typically a single Web page or form).

Potential customers may access WS 109 and the mentioned company or corporate Web site from anywhere in the Internet, from WAN 101, which may be a corporate network, or from a wireless carrier network such as WN 103. One with skill in the art will recognize the ambiguity relative to the physical boundaries of disparate networks and that bridging between these networks provided seamless transition of communications and data from one network to another.

LAN 106 supports a transaction server (TS) 120 enabled for SIP. TS 120 has a direct connection over a separate digital network to RS 119. TS 120 is adapted to set up live interactive sessions between potential customers and agents working within the CCE environment according to instruction served by RS 119. TS 120 includes a digital storage medium internal thereto or otherwise accessible thereto for storing the data and software required to enable server function. In this embodiment TS 120 is enhanced with SIP and may serve in some embodiments as an SIP proxy server. Other digital call control and setup protocols may be used in place of SIP in this example such as H.323 protocol without departing from the spirit and scope of the present invention. The inventor chooses SIP for multimedia session setup and teardown because of versatility and simplicity.

In this embodiment agent terminals 125 (*a-n*) in CG 104 have campaign applications installed one application per at each agent terminal. In this example they are computer desktop applications however in other embodiments they may be installed on other devices in addition to or instead of on a LAN connected PC such as on a SIP-enabled cellular telephone or SIP-enabled PBX phone connected to the network. Campaign applications 125 (*a-n*) are adapted to facilitate resource application and agent proficiency in communication with customers and in initiating consult requests to agents in sales when their services are required. Also in this embodiment agent terminals 123 (*a-n*) in SG 105 have sales applications installed one application per at each agent terminal. Sales application s 123 (*a-n*) are adapted to facilitate resource application and agent proficiency in communication with customers and in receiving consult call requests from agents in CG 104 and when accepted, data about pending transactions and information about the customers receiving the transaction assistance.

In one embodiment the CCE characterized by all of the described equipment and functionality supported by LAN 106 relies on a pure SIP environment for all live communication. In this case all communications devices are SIP enabled and have appropriate universal resource identifiers (URIs) for SIP and interaction routing purposes. A typical SIP URI for a SIP-enabled telephone might be of the form sip: usemame:password@host:port.

In practice of the present invention in one embodiment, inbound voice calls resulting from outbound campaign activity arrive at CS 113 for internal routing. From a business point of view, these inbound calls resulting from proactive solicitation activity are a higher priority than unsolicited inbound traffic, which may or may not require live assistance. Pre-solicited inbound calls are routed to AIQ CG 127 to wait for available agents working terminals 122 (*a-n*) in CG 104. These callers have accepted an outbound call and have agreed to talk with a campaign agent. EWT of queue 127 is controlled so that it is relatively short in duration to discourage any callers from dropping out of queue while waiting for a campaign agent. In one embodiment agents in CG 104 do not answer unsolicited inbound calls, in part to ensure agent availability for these higher priority pre-solicited interactions.

CTI processor 115 may request transaction service from SIP-enabled TS 120, which consults with RS 119 for routing strategy for each call registered as CS 113 and represented in queue 127 that has been determined by IVR 114 to require live assistance. When an agent such as an agent working at terminal 122 *c* becomes available, the next call at the top of queue 127 is routed to that agent. SIP-enabled TS 120 is responsible for setting up the SIP voice session and for tearing it down at conclusion of the session. A SIP session may be set up between CS 113 and the agent computing appliance or at the telephone of terminal 122 *c* in this example. The SIP session may be setup in this case between CS 113 and the telephone handset of agent terminal 122 *c* of CG 104. The telephone may in certain embodiments, register a ringing event and data about the call and caller will appear on the agent's desktop in the appropriate campaign application.

In this example the campaign agent qualifies the caller for a transaction with one of the sales agents of SG 105. Agents in SG 105 may be working normal unsolicited inbound traffic along with campaign traffic. Therefore, there may be periods of time during peak traffic where all of the agents of SG 104 are busy handling live transactions. During the conversation between the caller and the campaign agent working terminal 122*c* in this example, the caller may agree to a sales transaction. However, rather than putting the caller on hold to wait for an agent from SG 104 to become available in the case that there are no ready agents available to work the transaction, the campaign agent with the aid of the campaign application installed on the computing appliance, initiates an SIP request for sales consultation with a live agent from group 105.

In one embodiment the SIP request is an IM chat request deposited in a specialized queue SRQ 129 and SIP-enabled TS 120 processes the request from queue based on instruction from RS 119. In one embodiment all SIP requests for sales consultation from a live agent of SG 105 are sent directly to TS 120 where they are processed normally as an SIP request. A routing point is defined as a point in a process where a routing decision may be required. In this case the overall process is concluding a campaign call with a sales transaction facilitated by a second agent skilled in that purpose. The routing point occurs in the process if the caller verbally agrees to the prospect of engaging a second agent. In this case the sales consult request is initiated by the campaign agent manually and the routing point is defined within the routing code on RS 119.

TS 120 consults with RS 119 for routing strategy. RS 119 consults SS 117 for current availability statistics for agents working terminals 123(*a-n*). In a case where all of the agents are currently unavailable for voice interaction, the routing strategy picks the agent with a predicted least amount of handling time left in a current transaction compared to other agents who are busy handling transactions. RS 119 serves a routing instruction for the request for consult to TS 120, which sets up an IM channel between the initiating campaign agent working terminal 122*c* and the target sales agent, such as one working terminal 123*a* for example.

The target sales agent receives a chat request for a consult call from the original campaign agent while the caller is still in a voice session with the campaign agent. The sales agent can accept the IM chat session without interrupting the flow of the current transaction in which he or she may be engaged. The sales agent may be asked to accept a call transfer or a "conference in" using voice so that the sales agent may assist with or may take over the transaction from the campaign agent. All of the information relative to the call in progress and the caller may be conveyed to the agent through the IM session coupled with a file sharing session or capability also enabled through the session or enabled in a parallel session using a file sharing application in addition to the IM application. Some applications enable both file share and data transfer over the same SIP session. In one embodiment transfer of caller information and relevant data concerning the pending transaction is an automated function of routing so that when the SIP session between the campaign agent and the sales agent is established the relevant data is transferred from the appropriate storage database and from the call itself (data attached to call).

In a situation where the connected outbound calls take priority over direct, unsolicited inbound calls, the sales agents receiving IM requests for consulting may be required to engage these callers to assist in or to perform transactions before taking the next unsolicited inbound calls waiting in queue. Predictive routing strategy always selects a busy sales agent that has the least amount of estimated handling time left for handling their current transaction. In this way the current transactions can be finished without interruption and the priority calls coming into the campaign group do not have to wait in queue to wait for a sales agent to become available.

Figure 2:
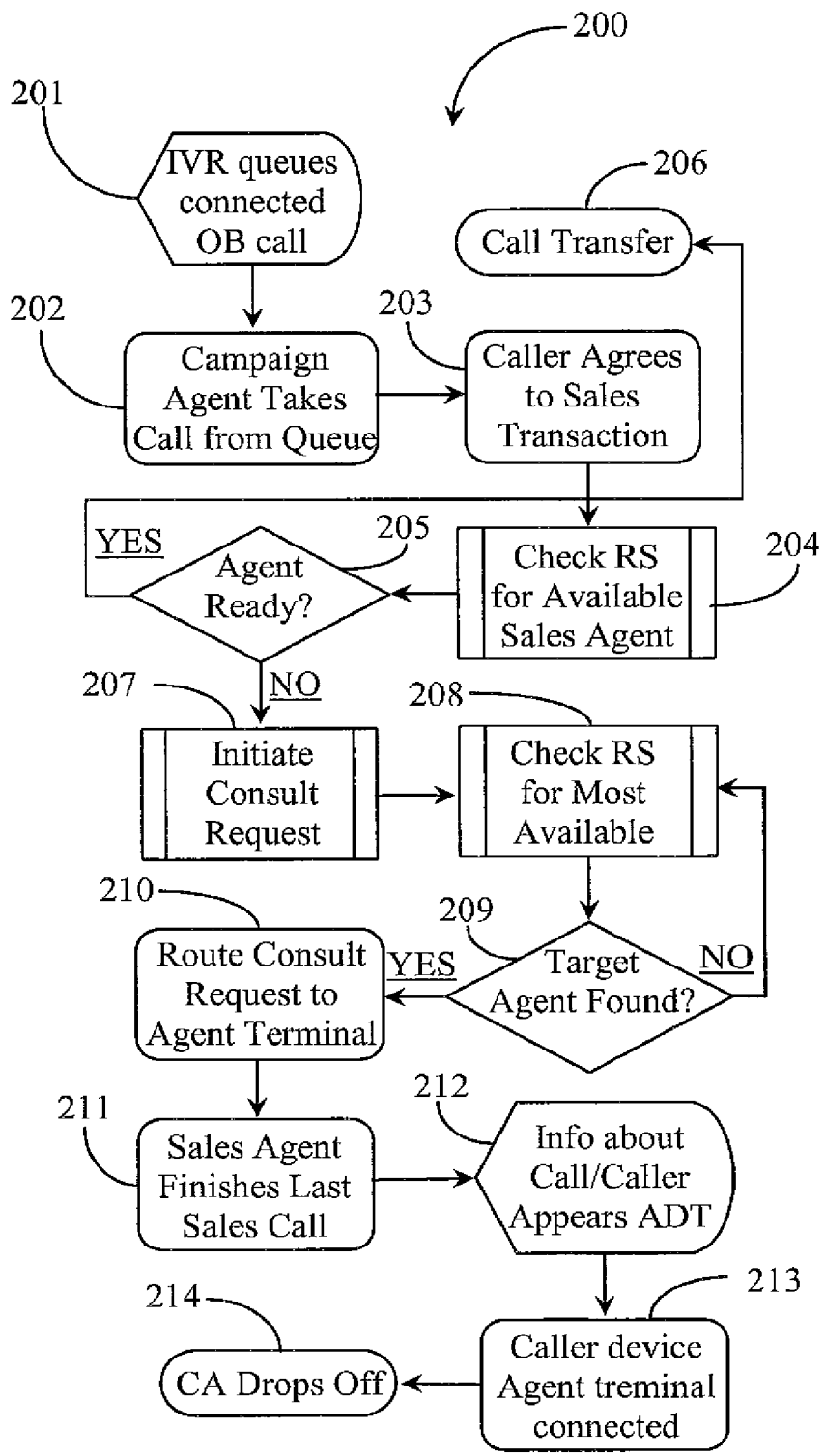
FIG. 2 is a process flow chart illustrating steps 200 for initiating a consult request for a call transfer according to an embodiment of the present invention.

FIG. 2 is a process flow chart 200 illustrating steps for initiating a consult request for a call transfer according to an embodiment of the present invention. At step 201 an outbound call connected to a caller is queued for an available agent from a campaign group such as CG 104 of FIG. 1. In this step the caller data and intent of the call may be displayed on the GUI of the computing appliance associated with the agent terminal of the agent selected to receive the call.

At step 202 the campaign agent takes the call. In one embodiment outbound calls are paced in frequency of dialing according to the availability statistics for the campaign agents working the queue. At step 203 the connected caller verbally agrees to a sales transaction. In one embodiment the IVR qualifies the caller for transaction and the campaign agent performs some preliminary processing, which must be performed before the transaction can move forward.

The transaction in this case is to be performed by a sales agent from a sales group, and it is assumed that the connected outbound calls have priority over any direct unsolicited inbound calls. It is also assumed that sales agents are working normal inbound traffic along with connected out bound calls. At step 204 a SIP-enabled transaction server responsible for building and tearing down communications sessions calls a routing server analogous to RS 119 of FIG. 1 to look for an available sales agent that can assist or take over the pending transaction. The routing server relies on statistics to determine availability of a sales agent.

At step 205 the system determines if there is an available sales agent ready to assist or to take a call transfer. If there is an agent ready to assist the campaign agent then at step 206 the call may be transferred to the sales agent to complete the transaction or the sales agent may be conference in to assist in the transaction. In this case the caller does not have to wait in queue because there is an idle sales agent ready to assist with the call. In a pure SIP embodiment the transaction server builds the connection for the call transfer or conference call. However, at step 205 there may not be an idle agent ready to engage the caller. That is to say that all sales agents may be currently busy handling transactions. In this case at step 205 it is determined that no agents are available to take the call. At step 207 the campaign agent in voice session with the caller initiates a SIP consult request in an alternate media like an IM chat request, for example.

SIP-enabled sales terminals may conduct both chat and voice sessions simultaneously. The request initiated at step 207 may be queued in a priority ordered sales queue wherein the request sits on top of the queue (first out) for processing. In one embodiment a specialized queue may be set up for queuing consult requests when all agents are busy. At step 208 the transaction server processes the request, in one embodiment, and calls the routing server to look for a most available agent. A most available agent is one that at the time of request routing that has the least amount of handling time left for finishing their current transaction considering that there are no idle agents available.

Determining the agent that will be first available is a predictive determination since average handling time may differ from agent to agent. In this case the total AHT for the sales group may be used as an indicator value and the agent with the most time in their current session is considered the most available agent or more particularly the agent that will be first available to work on the transaction. If at step 209 through some error no target agent is discovered then the process may loop back one step until a most available agent is identified through analysis of availability statistics. In case of more than one agent having the same AHT left for their current transactions, one of those agent may be randomly selected to receive the consult request.

In one embodiment the sales consult request is manually initiated by the campaign agent in session with the caller. In another embodiment as soon as the system determines that there are no idle agents, a consult request connected to that campaign agent is automatically generated on behalf of that campaign agent and current session. When a most available agent is determined at step 209, the SW-enabled transaction server routes the consult request at step 210 to the sales agent terminal. The request may be displayed in the sales application running on a LAN-connected computing appliance such as a desktop computer having a GUI. In another embodiment the IM request may be routed to another terminal device like a cellular telephone or a LAN connected PBX enabled for SIP communication and having a URI known to the routing system. The consult request may be a standardized request containing information such as the request initiator ID, the nature of the request if there may be more than one nature, and any other information that can be transferred with the request such as promotional codes or the like to aid in the transaction process.

At step 211 the target sales agent is alerted by visual and perhaps audible alert of the consult request received at the terminal. In this step the agent may finish his or her current sales transaction without interruption or distraction. Also in this step the agent may respond to the request by accepting the interaction causing the transaction server to establish the bidirectional IM session between the campaign agent and the sales agent. At step 212 all of the caller and call data required for finishing the transaction successfully may be conveyed to the sales agent over the established media session and may appear in the sales application on the agent desktop. The caller remains in voice session with the campaign agent during the whole process avoiding a wait in queue where there is a risk of call drop out.

At step 213 the SIP-enabled transaction server builds a voice session between the caller device (central switch) and the sales terminal so that a voice session is established between the caller and the sales agent. At step 214 the campaign agent may drop off (SIP session termination) leaving the caller to the sales agent for transaction processing. In one embodiment wherein the agent telephones or telephony applications are enabled for conferencing, the campaign agent may remain in session with the caller and the sales agent for training purposes or to assist the sales agent with any information not conveyed electronically to the sales agent. In one embodiment the campaign agent session is necessarily terminated at the same time the session between the sales agent and the caller is established. In one embodiment no voice session is established between the sales agent and the caller directly but the sales agent is patched into the existing session as a silent observer and the established IM session between the agents is used as a coaching channel. In this embodiment the sales agent may type suggestions to the campaign agent which would aid in closing the sale and finishing the transaction. Any data required for this process may be conveyed from the sales agent to the campaign agent of the alternate media session such as IM with file sharing capability, etc.

On with skill in the art of SIP-enabled communications networks will appreciate that data caused to appear in an agent interface may be transferred from one agent terminal to another over the P2P connection established, or it may be pushed to the target sales agent terminal from another source such as a CRM system or other server-based data storage system. Moreover there are manual, semi-automated, and wholly automated scenarios that can be accomplished without departing from the spirit and scope of the invention. Using the methods of the present invention, sales agents involved in other duties may be enlisted to process priority interactions without mandating that callers wait in queue for assistance. In one example agents attending a multi-party conference call meeting or multi-party webinar, for example can still be considered available for handling important transactions or for coaching other agents in transacting with customers without serious interruption to their current active sessions.

Figure 3:
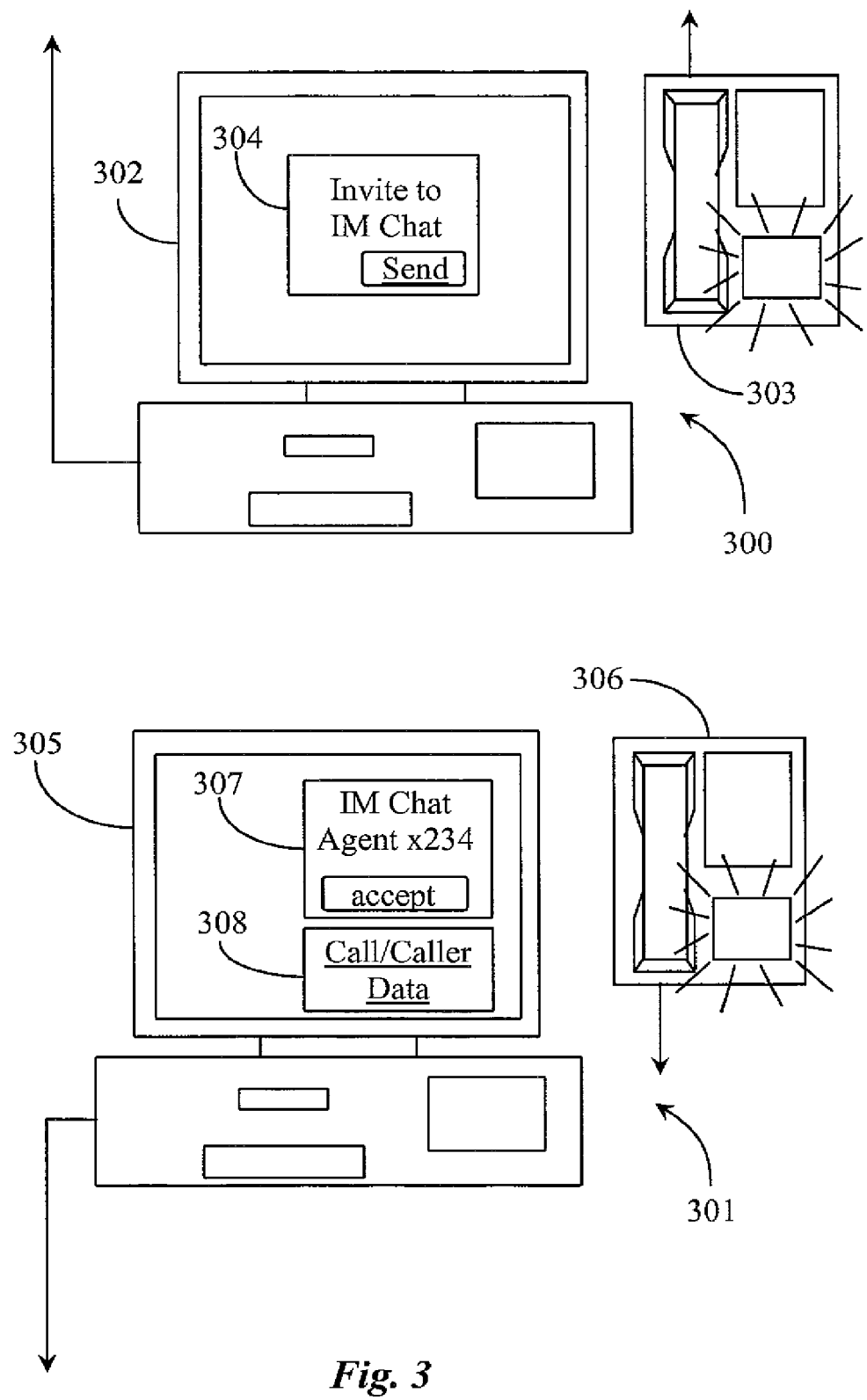
FIG. 3 is a block diagram illustrating a first and second agent terminal involved in a call transfer according to an embodiment of the present invention.

FIG. 3 is a block diagram illustrating a first and second agent terminal involved in a call transfer according to an embodiment of the present invention. A campaign agent's terminal 300, referred to herein as a first agent terminal is illustrated in this example and is analogous to any of agent terminals 122(a-n) of FIG. 1. Terminal 300 is defined as an end destination for an incoming call rather than a single end device. Terminal 300 includes a desktop computer 302 and a telephone handset 303. Both computer 302 and telephone handset 303 are enabled for SIP communication. Computer 302 is LAN connected and has an SIP URI for routing purposes when a SIP-enabled communications application is running such as IM, a VoIP application or a campaign application nesting one or more communications applications.

Telephone handset 303 may be LAN connected or it may be connected directly to a telephone switch. In one embodiment telephone handset 303 may be a PBX phone capable of VoIP voice communication, video and text chat, and file sharing. Other communications equipment hardware and software configurations may exist in this example without departing from the spirit and scope of the present invention. A sales agent's terminal 301 also referred to herein as a second agent terminal includes a LAN-connected desktop computer 305 and a telephone handset 306 connected to the LAN or to a central telephone switch whatever the case may be in the CCE.

In this exemplary embodiment handset 303 has an active call in progress resulting from proactive contact and connection through an outbound calling campaign or some other proactive activity. This results in an inbound call to the campaign agent in progress on telephone handset 303. During this conversation, the operating agent initiates an IM chat request 304 for sales consulting provided by a second agent operating, in this case, terminal 301. Invitation or request 304 may be may be initiated semi-automatically from a pre-prepared template designed to request a sales consulting from a receiving sales agent. The campaign agent may send the request by typing in the appropriate information and hitting the send button similar to many chat communications procedures.

In this case the sales agent or second agent operating agent terminal 301 receives the IM request 307 on computer 305, and it is displayed in plain view and may come with an audible alert so the agent knows exactly when the message is received. In one embodiment the sales agent has an option for accepting or rejecting the request. In this case hitting accept causes an SIP session to be created between the agents' terminals and further messages from the first agent may be generated and sent to the second agent who may respond to the messages. In a more structured campaign environment it may be that receipt of a consult request automatically obliges the second agent to accept and respond to the request in the manner requested such as taking over the transaction or coaching the first agent to handle or complete the transaction. Call/Caller data 308 may also appear on the computer display of the second agent including promotional codes, product/service information, and any other data helpful in resolving the transaction or in assisting the second agent in coaching the first agent.

Telephone handset 306 registers a ring event in the case of a call transfer of the call in progress on handset 303 to handset 306. The IM session between the first and second agent provides information and assurances of assistance for the caller who remains in session with the first agent during the process of setting up and establishing the IM connection between the agent terminals. In the case of a call transfer the first agent may drop out when the second agent is in session with the caller.

Figure 4:
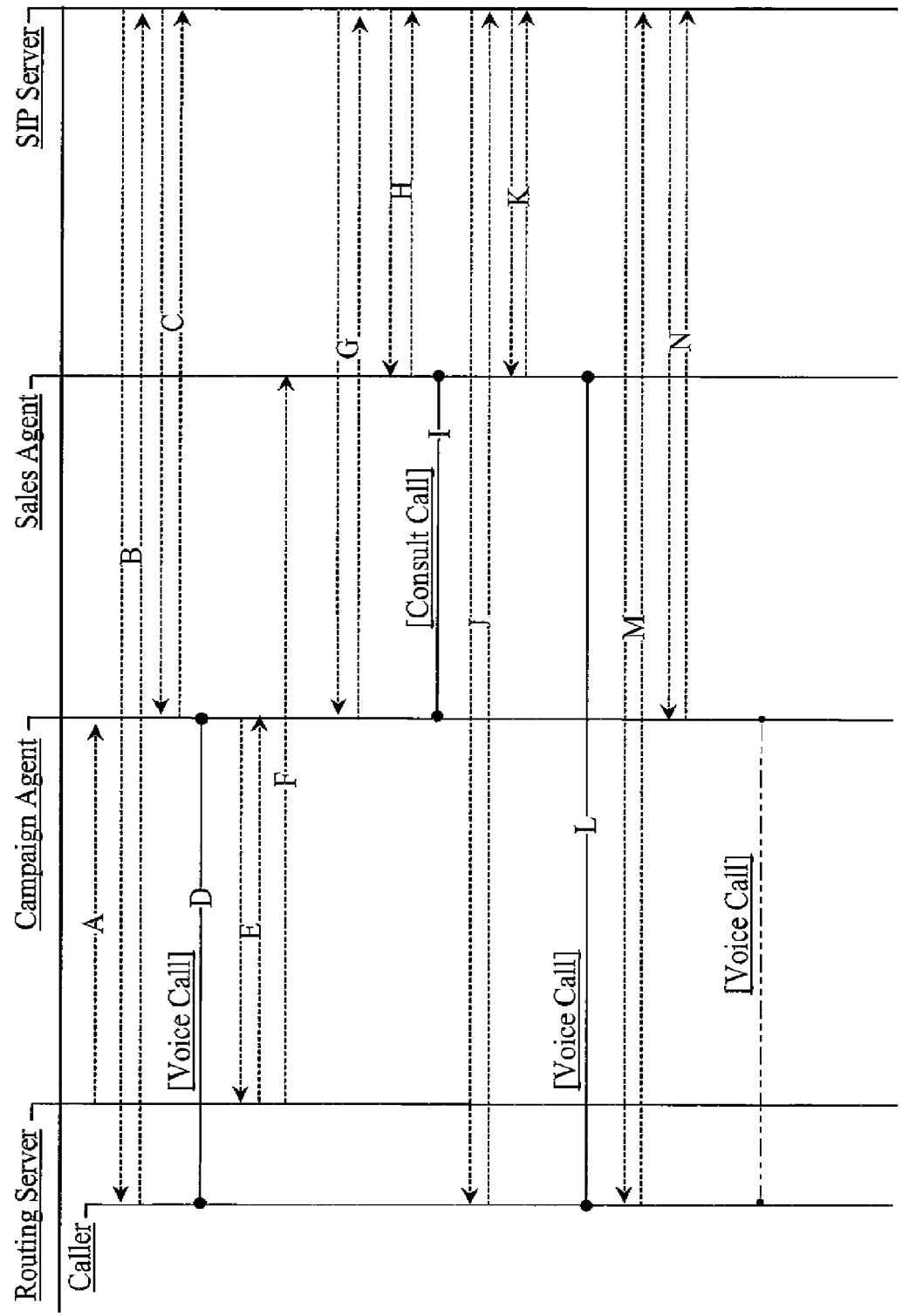
FIG. 4 is a call flow diagram illustrating session setup and teardown using SIP according to an embodiment of the present invention.

FIG. 4 is a call flow diagram illustrating session setup and teardown using SIP according to an embodiment of the present invention. In one embodiment the call consult request sent by a first agent in session with a caller to a second agent results in a call transfer. In a pure SIP embodiment for a next caller in queue, a routing server sends routing instruction A targeting an available campaign agent to take a call. A SIP server, which may be hosted on a transaction server analogous to TS 120 of FIG. 1 sets up the call legs B of the pending SIP voice session between the server and the switch or SIP-enabled caller device. The SIP server then sets up the call legs C between the Campaign agent's SIP-enabled terminal and the server resulting in an established voice session D between the caller and the campaign agent's terminal.

At a point in the conversation where the caller agrees to a transaction, the campaign agent may send a SIP request E to the routing server for consulting a sales agent, the request queued for an available agent in a priority ordered sales queue or in a specialized request queue. The routing server targets F a sales agent or second agent to receive a SIP consult request in an alternate media such as IM chat. The SIP server builds the call legs G between the first terminal of the campaign agent and the server, and the call legs H between the targeted sales agent terminal and the server resulting in an established IM consult call I between the campaign agent and the sales agent.

The IM session takes place while the caller is in voice session with the first agent. The consult call may result in a call transfer and if so the SIP server establishes the call legs J between the caller terminal and the server, and the call legs K between the sales agent terminal and the server resulting in voice session L established between the caller and the second agent. When the caller is in session with the second agent, the SIP server terminates the first voice session D by tearing down the call legs M and the call legs N resulting in termination of the session between the caller and the first agent. The second agent can then finish the sales transaction and the campaign agent can take a next call.

Figure 5:
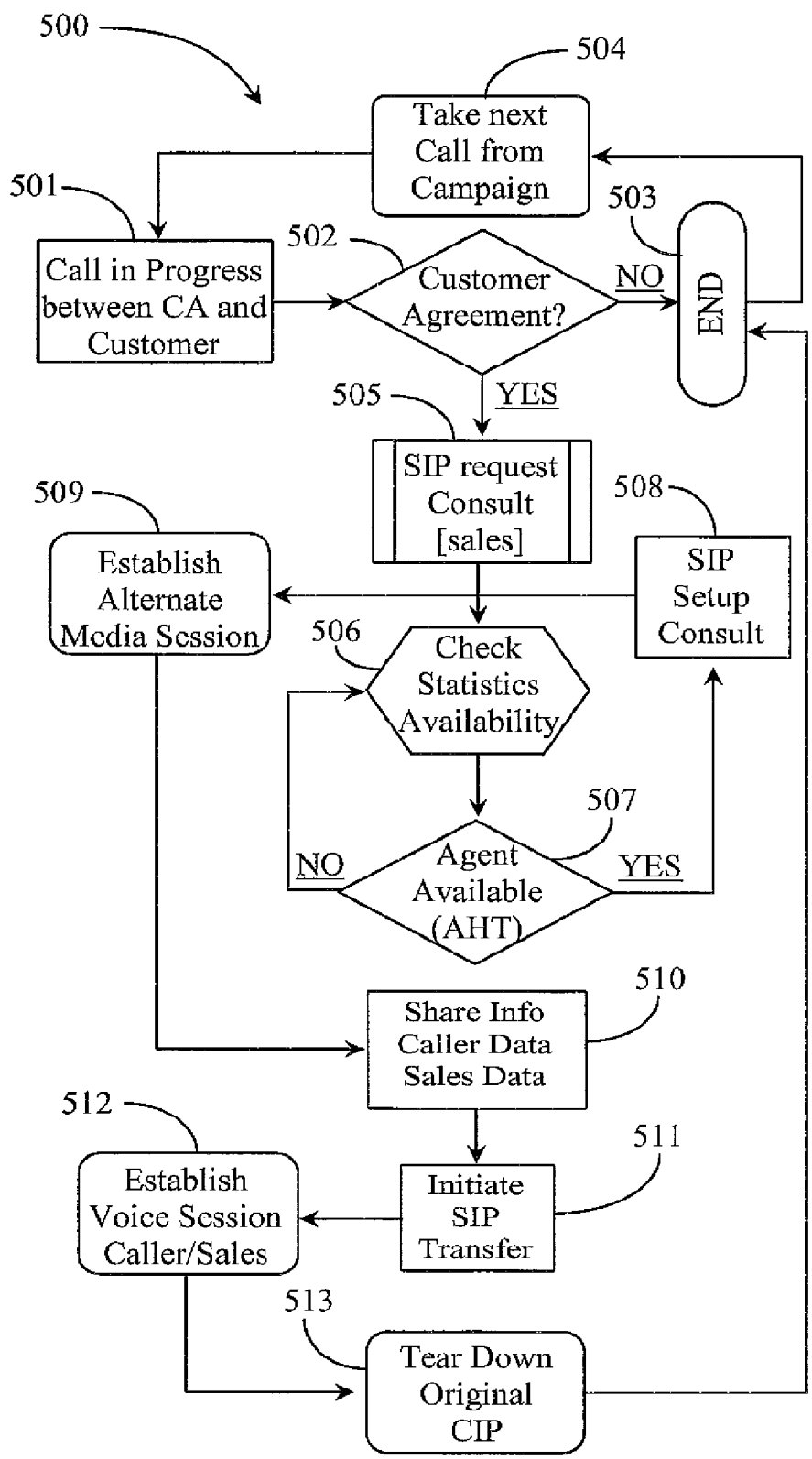
FIG. 5 is a process flow chart illustrating steps 500 for synchronizing routing routine with SIP services according to an embodiment of the present invention.

FIG. 5 is a process flow chart illustrating steps 500 for synchronizing routing routine with SIP services according to an embodiment of the present invention. In step 501 a call is in progress between a campaign agent and a customer. The call proceeds and in step 502 the agent determines if the customer has agreed to a transaction to be completed by a second agent. If at step 502 the customer does not agree to a transaction then the process may end for that customer at step 503 and the campaign agent may subsequently take a next call at step 504 resulting in the state described at step 501 again. If the customer agrees to a transaction at step 502 a SIP request for a consult call may be initiated by the first agent at step 505. In one embodiment the request is queued in a priority ordered queue for a sales group of agents wherein the consult request takes priority over any other queued requests to be processed. In another embodiment there is a special queue set up for such consult requests.

At step 506 the system checks for agent availability. In absence of a completely idle sales agent, agent availability is based on the agent that has the least amount of time left for finishing a current transaction based on an average AHT for the group for the type of transaction. At step 507 if the system determines that no agent is available it may be due to an error as there should be at least one available agent under the given definition of availability so the process may resolve back to step 506 until an agent is identified to receive the consult request.

When an available second agent is identified at step 507 based on the lowest time remaining before the current transaction is completed and as compared to the other agents in the same group, the SIP server sets up a consult call between the first and second agents at step 508. At step 509 a consult session is established in a media other than voice like IM, for example. During the consult session, the caller remains on the line with the first agent. At step 510 data about the caller and call including sales information, promotional codes, etc. may be shared with the second agent. The data may be transferred from the first agent terminal tot the second agent terminal using an SIP data channel coupled with the IM chat session or running parallel to the chat session. In another embodiment this data may be pushed to the agent terminal from some other location like a central database server that records all interactions and associated data. In one embodiment the data shared with the second agent arrives at the agent's terminal while the agent is still engaged in concluding the current transaction.

In the event that the consult call is a request for a call transfer requiring a voice connection between the caller and the second agent, the transaction server initiates the SIP call transfer at step 511. The trigger for this action may be an indication by the second agent that the consult call requesting the transfer has been accepted. In one embodiment the initiation of the call transfer is an automated SIP service beginning at the termination point of the current voice session the second agent is working on. At step 512 a SIP voice session is established between the caller and the second sales agent. At step 513 the SIP server tears down the original call in progress and the process ends at step 503 for that caller. The campaign agent involved in the original session torn down at step 513 is freed up to accept the next call for processing.

With SIP synchronization across the board for session setup and teardown, callers to be transferred to second agents never have to wait in queue for an agent to become available. The time it takes to connect to a second agent is never more than the AHT for a single transaction. This assumes of course that priority is given to the callers that have responded to outbound contact. The frequency of outbound calls can also be paced so that unsolicited inbound traffic is handled within the scope of service objectives of the CCE.

It will be apparent to one with skill in the art that the multi-media call distribution system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A multimedia router, comprising:
    a processor; and
    a memory, wherein the memory stores instructions that, when executed by the processor, cause the processor to:
    identify a current communication session between a customer and a first agent using a first communication medium;
    receive, from the first agent, a request for second communication with a second agent using a second communication medium different from the first communication medium;
    establish the second communication using the second communication medium between the first agent and the second agent, while maintaining the current communication session between the customer and the first agent;
    transfer, automatically, to the second agent when the second communication is established, caller information and data corresponding to the current communication session; and
    join the second agent to the current communication session for establishing a third communication between the customer and the second agent using the first communication medium.

2. The multimedia router of claim 1, wherein the instructions further cause the processor to identify the second agent from a plurality of second agents based on a prediction of availability of the second agent and an amount of handling time left for finishing current transactions among the second agents.

3. The multimedia router of claim 1, wherein the first agent remains a party to the current communication session with the customer after the second agent joins the current communication session.

4. The multimedia router of claim 3, wherein the instructions further cause the processor to disconnect the first agent from the current communication session after second agent joins the current communication session.

5. The multimedia router of claim 1, wherein the instructions further cause the processor to establish a conference call between the first agent, the second agent, and the customer.

6. The multimedia router of claim 1, wherein the instructions further cause the processor to identify another second agent in response to the second agent not accepting the request for the second communication.

7. The multimedia router of claim 1, wherein the instructions further cause the processor to display the request for the second communication between the first agent and the second agent as a visual or audio alert on a terminal operated by the second agent.

8. The multimedia router of claim 1, wherein the current communication session is a voice communication session, and the second communication is a non-voice communication.

9. The multimedia router of claim 1, wherein the instructions further cause the processor to provide data about the current communication session to the second agent.

10. The multimedia router of claim 1, wherein the instructions further cause the processor to enable the second communication between the first agent and the second agent after joining the second agent to the current communication session.

11. A method for routing calls, the method comprising:
    identifying, by a processor, a current communication session between a customer and a first agent using a first communication medium;

receiving, by the processor, from the first agent, a request for second communication with a second agent using a second communication medium different from the first communication medium;

establishing, by the processor, the second communication using the second communication medium between the first agent and the second agent, while maintaining the current communication session between the customer and the first agent;

transferring, by the processor, automatically, to the second agent when the second communication is established, caller information and data corresponding to the current communication session; and joining, by the processor, the second agent to the current communication session for establishing a third communication between the customer and the second agent using the first communication medium.

12. The method of claim 11, further comprising identifying, by the processor, the second agent from a plurality of second agents based on a prediction of availability of the second agent and an amount of handling time left for finishing current transactions among the second agents.

13. The method of claim 11, wherein the first agent remains a party to the current communication session with the customer after the second agent joins the current communication session.

14. The method of claim 11, further comprising disconnecting, by the processor, the first agent from the current communication session after second agent joins the current communication session.

15. The method of claim 11, wherein joining the second agent to the current communication session includes establishing, by the processor, a conference call between the first agent, the second agent, and the customer.

16. The method of claim 11, further comprising identifying, by the processor, another second agent in response to the second agent not accepting the request for the second communication.

17. The method of claim 11, further comprising displaying, by the processor, the request for the second communication between the first agent and the second agent as a visual or audio alert on a terminal operated by the second agent.

18. The method of claim 11, wherein the current communication session is a voice communication session, and the second communication is a non-voice communication.

19. The method of claim 11, further comprising providing, by the processor, data about the current communication session to the second agent.

20. The method of claim 11, further comprising enabling, by the processor, the second communication between the first agent and the second agent after joining the second agent to the current communication session.

* * * * *